(12) United States Patent
Eshel et al.

(10) Patent No.: US 9,661,251 B1
(45) Date of Patent: May 23, 2017

(54) ADAPTIVE GAIN CONTROL USING SAMPLE-AND-HOLD CIRCUIT FOR ANALOG CDS

(71) Applicant: Sony Semiconductor Solutions Corporation, Kanagawa (JP)

(72) Inventors: Noam Eshel, Pardesia (IL); Golan Zeituni, Kfar-Saba (IL)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/928,536

(22) Filed: Oct. 30, 2015

(51) Int. Cl.
*H04N 5/378* (2011.01)
*H04N 5/357* (2011.01)

(52) U.S. Cl.
CPC ............ *H04N 5/378* (2013.01); *H04N 5/3575* (2013.01)

(58) Field of Classification Search
None
See application file for complete search history.

(56) References Cited

U.S. PATENT DOCUMENTS

| | | | |
|---|---|---|---|
| 5,886,659 A * | 3/1999 | Pain ...................... | H04N 3/155 341/144 |
| 9,525,837 B1 * | 12/2016 | Eshel ..................... | H04N 5/378 |
| 2015/0156413 A1 * | 6/2015 | Do ......................... | H04N 5/357 348/218.1 |
| 2016/0014366 A1 * | 1/2016 | Chiaverini ............. | H04N 5/378 348/300 |

* cited by examiner

*Primary Examiner* — Justin P Misleh
(74) *Attorney, Agent, or Firm* — Michael Best & Friedrich LLP

(57) ABSTRACT

An image processing circuit includes a first sample-and-hold circuit that samples a first data from a pixel, a second sample-and-hold circuit that samples a second data from the pixel, a voltage-to-current circuit that includes a resistor and a current source and receives the first and second data to output a difference data, an adaptive gain control determination circuit that determines whether a rate of change of a signal from the pixel exceeds a threshold based on an output of the second sample-and-hold circuit, and a current-mode ADC that converts the difference data from an analog form to a digital form.

20 Claims, 12 Drawing Sheets

| Timing Phase | Reset Phase | Black Sun Comparison | Tx | AGC | Data Sampling |
|---|---|---|---|---|---|
| Status | Both Switches Off | BS Switch On AGC Switch Off | Both Switches On | Both Switches On | Both Switches On |
| | $C_{samp}$ Charged to $V_{in}^- - I \times (R_1 + R_2)$ | Comparator Threshold $I \times R_1$ | | Comparator Threshold $I \times (R_1 + R_2)$ | |

FIG. 13

ADAPTIVE GAIN CONTROL USING SAMPLE-AND-HOLD CIRCUIT FOR ANALOG CDS

BACKGROUND OF THE INVENTION

1. Field of the Invention

This application relates generally to image sensor readout chains, which includes sample-and-hold circuits. More specifically, this application relates to an image sensor readout circuit that implements analog gain to improve noise performance and maintain dynamic range.

2. Description of Related Art

Image sensing devices typically consist of an image sensor, generally an array of pixel circuits, as well as signal processing circuitry and any associated control or timing circuitry. Within the image sensor itself, charge is collected in a photoelectric conversion device of the pixel circuit as a result of the impingement of light.

One example of a pixel circuit is illustrated in FIG. 1. As shown in FIG. 1, a pixel circuit 100 includes a photoelectric conversion device 101 (for example, a photodiode), a floating diffusion FD, a transfer transistor 102, a reset transistor 103, an amplification transistor 104, and a selection transistor 105, and a vertical signal line 106. As illustrated, vertical signal line 106 is common to a plurality of pixel circuits within the same column. Alternatively, a vertical signal line may be shared among multiple columns. Gate electrodes of transfer transistor 102, reset transistor 103, and selection transistor 105 receive signals TRG, RST, and SEL, respectively. These signals may, for example, be provided by the control or timing circuitry.

While FIG. 1 illustrates a pixel circuit having four transistors in a particular configuration, the current disclosure is not so limited and may apply to a pixel circuit having fewer or more transistors as well as other elements, such as capacitors, resistors, and the like. Additionally, the current disclosure may be extended to configurations where one or more transistors are shared among multiple photoelectric conversion devices.

The voltage at signal line 106 is measured at two different times under the control of timing circuits and switches, which results in a reset signal ("P-phase value") and light-exposed or data signal ("D-phase value") of the pixel. This process is referred to as a correlated double sampling (CDS) method. The reset signal is then subtracted from the data signal to produce a value which is representative of an accumulated charge in the pixel, and thus the amount of light shining on the pixel. The accumulated charge is then converted to a digital value. Such a conversion typically requires several circuit components such as sample-and-hold (S/H) circuits, analog-to-digital converters (ADC), and timing and control circuits, with each circuit component serving a purpose in the conversion. For example, the purpose of the S/H circuit may be to sample the analog signals from different time phases of the photo diode operation, after which the analog signals may be converted to digital form by the ADC. A single-slope ADC is illustrated in FIG. 1, including a comparator 110, a digital counter 120, and a ramp reference voltage $V_{ramp}$. In FIG. 1, an analog sample and hold circuit is not included, and the sampling of the signal is done digitally by the ramp ADC.

FIG. 2 illustrates a waveform and timing diagram for the different timing phases in acquiring the reset and data signals from a pixel, as well as an example of the voltage VSL during different phases. In FIG. 2, the solid line illustrates a VSL signal when the incoming illumination is at a comparatively low level, whereas the dashed line illustrates a VSL signal when the incoming illumination is at a comparatively high level, where both high and low are within the normal operation level of the pixel under suitable exposure control. As illustrated, the voltage VSL is a result of the photodiode collecting negative charges when it is exposed to light. The reset value is not affected by the incoming illumination when the illumination is within the normal range of pixel operation. That is, the reset value is the same whether the illumination is high or low within this range of operation. The data value, on the other hand, does show a difference, where the data signal level is lower when the illumination is stronger.

As illustrated by FIG. 2, VSL settles to a steady voltage after the pixel has been reset. Then, in the above example where a single-slope ADC is used, the ADC measures the voltage VSL beginning with the start of the reset settling followed by the "ADC of reset signal" period. During this measurement, $V_{ramp}$ begins at a high level and then decreases linearly as a function of time from this initial high level. Simultaneously, the digital counter starts counting from zero while monitoring the output of the comparator so as to stop counting when the comparator changes state. At this point, the stopped count value is a digital value corresponding to the reset signal of the pixel. The data signal value of the pixel is then measured in a similar fashion after the signal line VSL has once again settled; i.e., during the "data noise integration" period illustrated in FIG. 2. The difference between the data and reset values is then interpreted as the amount of illumination on the pixel.

In many practical pixel readout circuits, there is a tradeoff between ADC noise floor and ADC maximum input level. In order to best sense the pixels with low illumination, the readout chain is preferably set to provide high signal gain with lowest input referred noise. At strong illumination, on the other hand, the readout chain is preferably set to provide low signal gain in order not to have saturation. In other words, the preferred settings for low illumination pixels and high illumination pixels are different.

In summary, common attempts to improve noise performance may reduce the dynamic range of the image sensor. Thus, there exists a need for a pixel readout chain that improves the signal-to-noise ratio (SNR) without degrading the dynamic range of the image sensor.

BRIEF SUMMARY OF THE INVENTION

Various aspects of the present disclosure relate to a sample-and-hold circuit and/or a black sun detection circuit for improving the operation of a sample-and-hold circuit.

In one aspect of the present disclosure, an image processing circuit comprises a first sample-and-hold circuit configured to sample a first data from a pixel; a second sample-and-hold circuit configured to sample a second data from the pixel; a voltage-to-current circuit including a resistor and a current source, and configured to receive the first data and the second data and output a difference data; an adaptive gain control determination circuit configured to determine whether a rate of change of a signal from the pixel exceeds a first predetermined threshold based on an output of the second sample-and-hold circuit; and a current-mode analog-to-digital converter configured to convert the difference data from an analog form to a digital form.

In another aspect of the present disclosure, a method of processing an image comprises sampling a first data from a pixel by a first sample-and-hold circuit; sampling a second data from the pixel by a second sample-and-hold circuit;

receiving the first data and the second data by a voltage-to-current circuit including a resistor and a current source; outputting a difference data by the voltage-to-current circuit; determining whether a rate of change of a signal from the pixel exceeds a predetermined threshold by an adaptive gain control determination circuit based on an output of the second sample-and-hold circuit; and converting the difference data from an analog form to a digital form by a current-mode analog-to-digital converter.

In yet another aspect of the present disclosure, an imaging device comprises: a pixel including a photoelectric conversion device configured to convert an incident light into an analog signal; and an image processing circuit, including: a first sample-and-hold circuit configured to sample a first data from the pixel, a second sample-and-hold circuit configured to sample a second data from the pixel, a voltage-to-current circuit including a resistor and a current source, and configured to receive the first data and the second data and output a difference data, an adaptive gain control determination circuit configured to determine whether a rate of change of the analog signal from the pixel exceeds a predetermined threshold based on an output of the second sample-and-hold circuit, and a current-mode analog-to-digital converter configured to convert the difference data from an analog form to a digital form.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which:

FIG. 13 illustrates an exemplary operation schedule for a circuit according to FIG. 12.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

In this manner, the present disclosure provides for improvements in the technical field of signal processing, as well as in the related technical fields of image sensing and image processing.

[Analog Gain]

Figure 3:
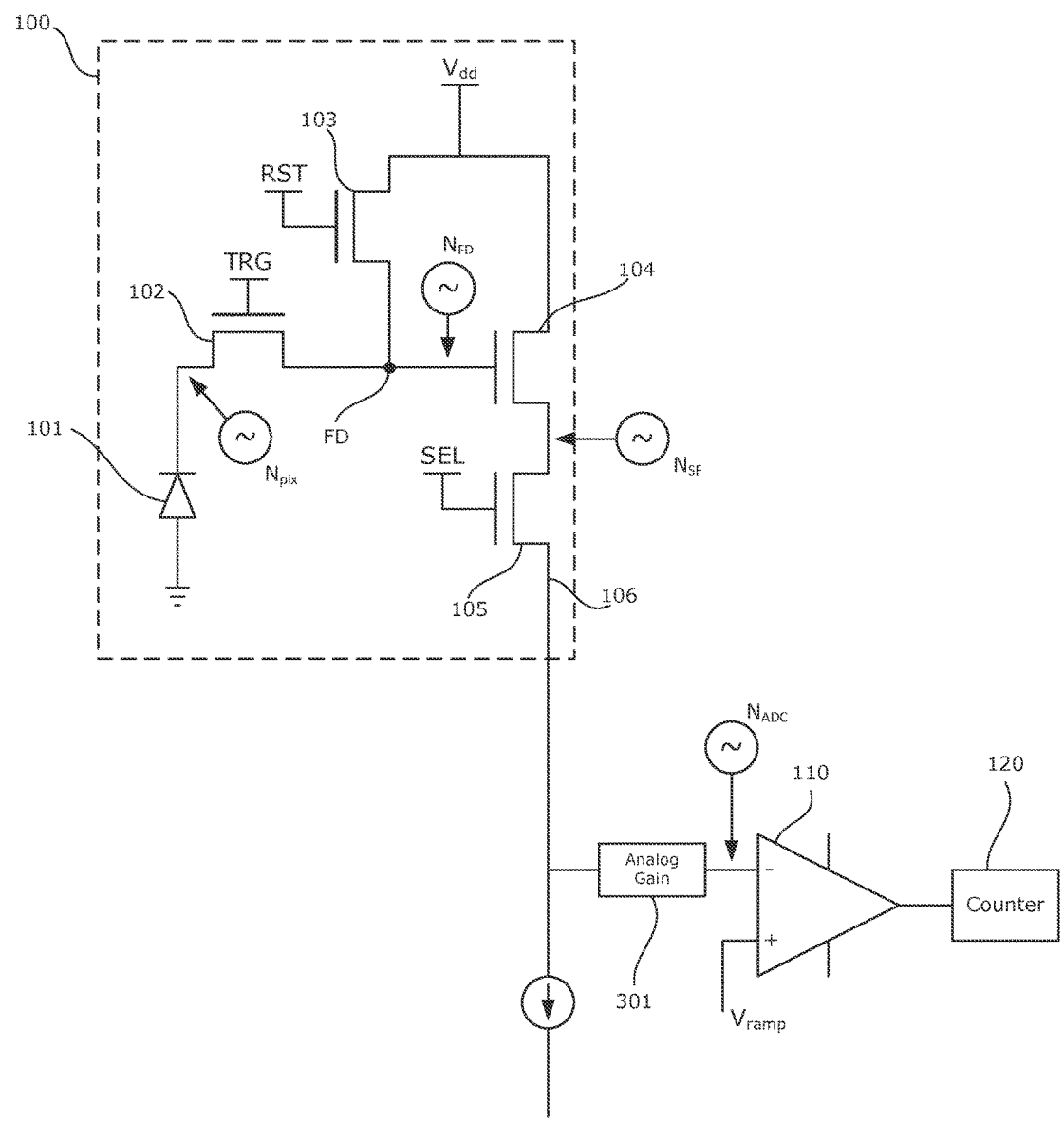
FIG. 3 illustrates an exemplary pixel circuit with analog gain.

FIG. 3 illustrates a pixel circuit such as the pixel circuit 100 with an analog gain circuit 301. FIG. 3 also illustrates various noise sources including pixel noise $N_{pix}$, floating diffusion noise $N_{FD}$, source-follower noise $N_{SF}$, and ADC noise $N_{ADC}$. Analog gain circuit 301 amplifies the signal VSL present on vertical signal line 106, and thus also amplifies $N_{pix}$, $N_{FD}$, and $N_{SF}$. However, because the analog gain is applied prior to the ADC stage, $N_{ADC}$ is unaffected. Thus, the signal to ADC noise ratio is higher if the analog gain is larger than 1 as compared to the case without analog gain. Thus, the inclusion of analog gain circuit 301 improves the noise performance of the associated image sensor.

Figure 4:
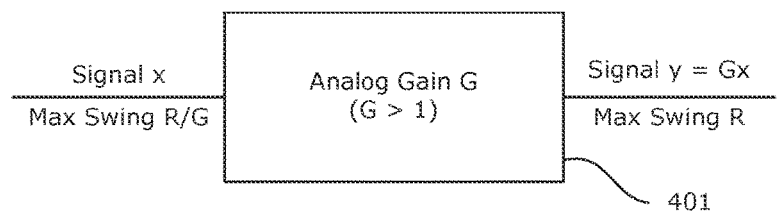
FIG. 4 illustrates an exemplary relationship between analog gain and dynamic range according to various aspects of the present disclosure.

The dynamic range R of an image sensor circuit is determined by the maximum possible voltage swing of the signals in the circuit, divided by the noise of a dark pixel. Because the voltage swing of a particular circuit design is fixed, the dynamic range is also fixed. FIG. 4 illustrates the effect of analog gain on the operation of a circuit in view of the fixed nature of the dynamic range. In FIG. 4, a signal x from a pixel circuit being input to an analog gain circuit 401. Analog gain circuit 401 applies a gain G, where G is larger than 1. Thus, the output signal y is G×x. Where the analog gain G is applied to the entire image, the maximum possible swing of y is the same as the maximum possible swing of the circuit, R. Therefore, the maximum swing of x is R/G, because any value larger than this will become clipped after analog gain is applied. In other words, if analog gain is applied indiscriminately to the entire image, the dynamic range of the circuit is reduced. Thus, it is preferable to apply the analog gain selectively to only a portion of the pixels in the sensor, so that the dynamic range of the circuit is maintained while still realizing the noise reduction benefits of analog gain.

[Adaptive Gain Control]

Figure 5:
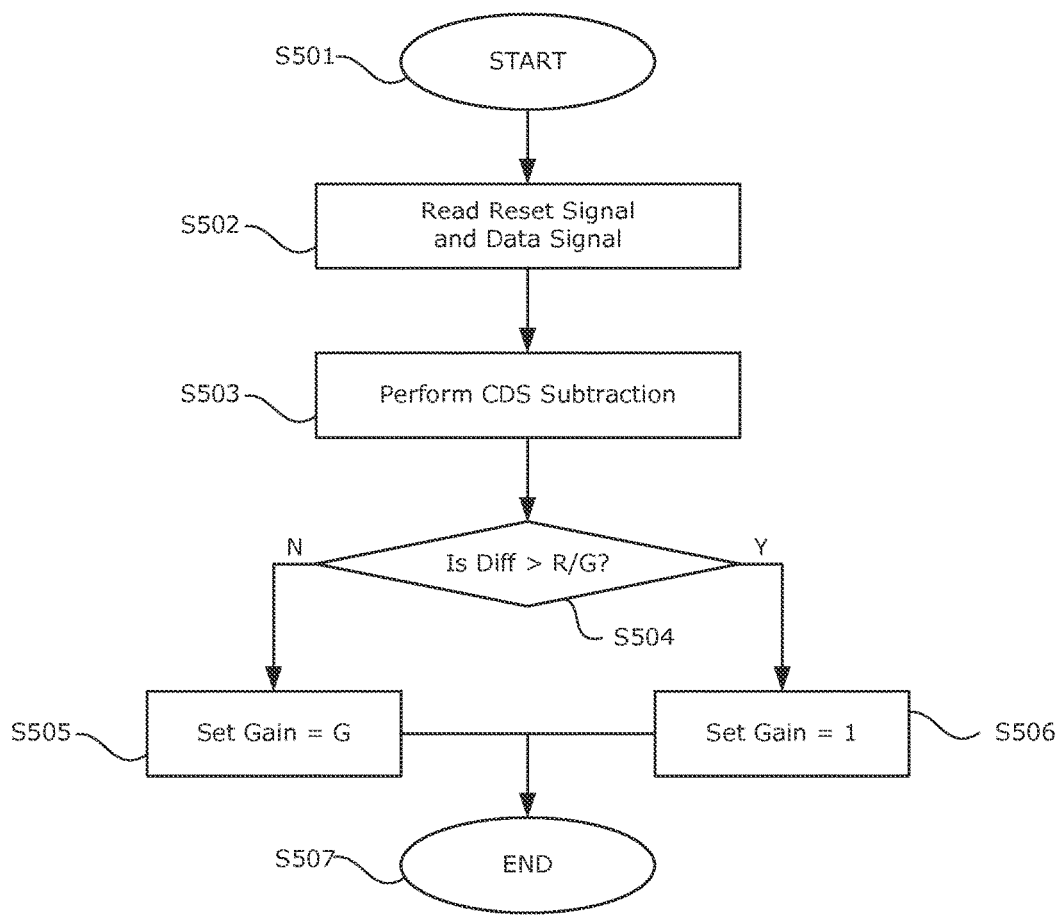
FIG. 5 illustrates an exemplary process flow for the logic of an adaptive gain control according to various aspects of the present disclosure.

To maintain this dynamic range, it is preferable to utilize two different analog gains in the sensor circuit, and to control the gain selection adaptively ("Adaptive Gain Control" or AGC). Specifically, it is preferable to use a first analog gain of 1 ("low") and a second analog gain of G ("high"), where G>1. FIG. 5 illustrates an exemplary process flow of the analog gain decision for each pixel in the image sensor. The process begins at step S501, and then at step S502 samples both the reset and data signals from the pixel. Next, at step S502, CDS subtraction is performed. Because CDS subtraction is performed while the signal is still in the analog domain, this step is performed by an analog circuit. At step S503, the value of the difference signal Diff is compared to a threshold, which is set to the value R/G. If the value of Diff is less than or equal to R/G, the analog gain is set to G in step S505. If, on the other hand, the value of Diff is larger than R/G, the analog gain is set to 1 in step S506. Once the analog gain has been set, the process terminates at step S507 and is begins again for the next pixel in the sensor. This procedure is repeated for each pixel in the sensor.

Figure 6:
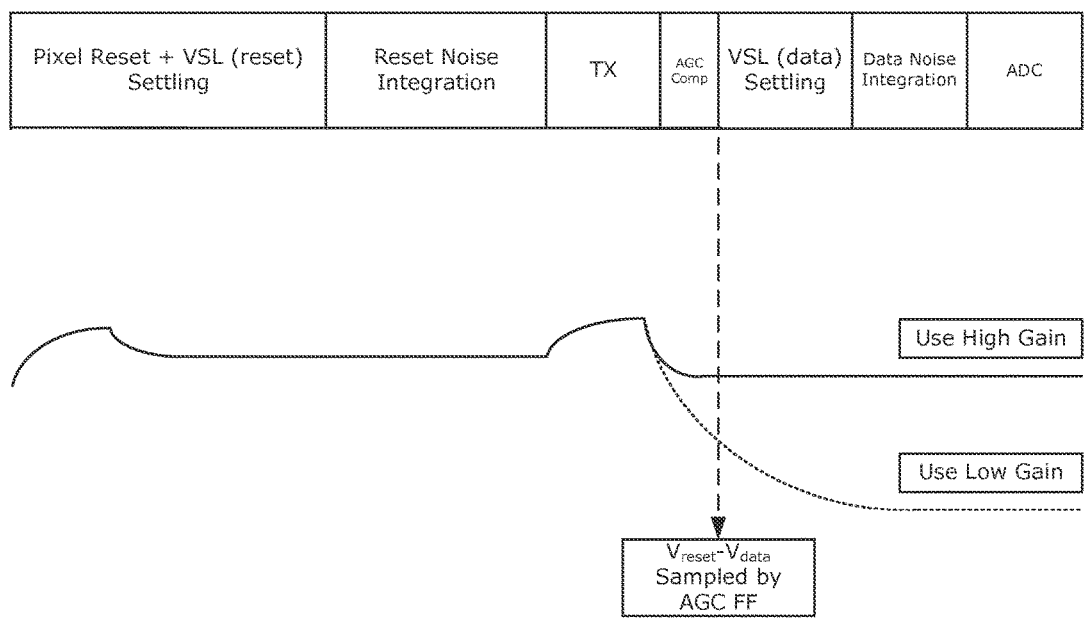
FIG. 6 illustrates exemplary timing phases and VSL waveform for a pixel circuit implementing adaptive gain control according to various aspects of the present disclosure.

FIG. 6 illustrates a modified VSL waveform implementing a detection mechanism to detect whether the signal is high or low. As illustrated in FIG. 6, there is an AGC Compensation (Comp) timing period, at which the process according to FIG. 5 is implemented. If it is determined that a comparatively low signal exists, the high gain value is used. If, instead, it is determined that a comparatively high signal exists, the low gain value is used.

Thus, it is guaranteed that the maximum swing of the output (that is, after the analog gain stage) will always stay within the usable dynamic range R of the circuit. Concurrently, average noise performance of the image sensor is improved because the signals with a level lower than R/G are amplified by the analog gain and thus exhibit an improved SNR. While FIGS. 5-6 illustrate only two analog gain values, more than two analog gains may be utilized and selected among for further improvement in SNR while maintaining dynamic range.

Using the analog circuit logic illustrated in FIG. 5, the two types of pixels (i.e. those with analog gain 1 and those with analog gain G) are marked so that the digital signal processing (DSP) circuit after ADC may distinguish between pixels that are high gain pixels and pixels that are low (unit) gain pixels. The DSP circuit preferably then normalizes the two types of pixels in digital form so that a proper and uniform image may be formed. For example, such a DSP circuit can divide the digital value of the high gain pixels by the factor G. Because this is done in digital form, it does not affect the SNR and thus the improved SNR of the sensor may be maintained.

Figure 7A:
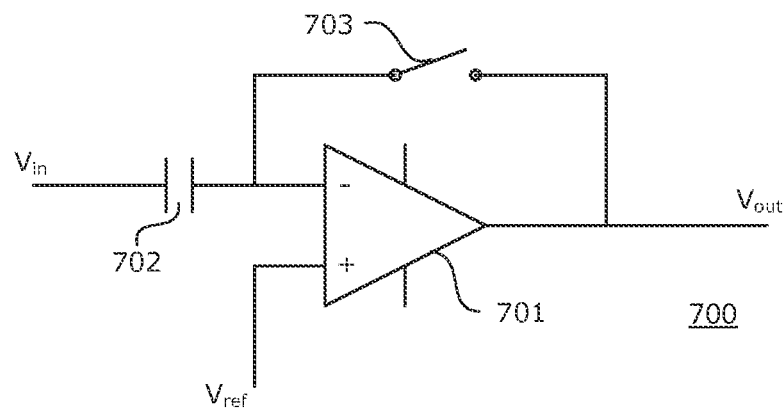
FIGS. 7A-C illustrate an exemplary switched-capacitor comparator according to various aspects of the present disclosure.
Figure 7B:
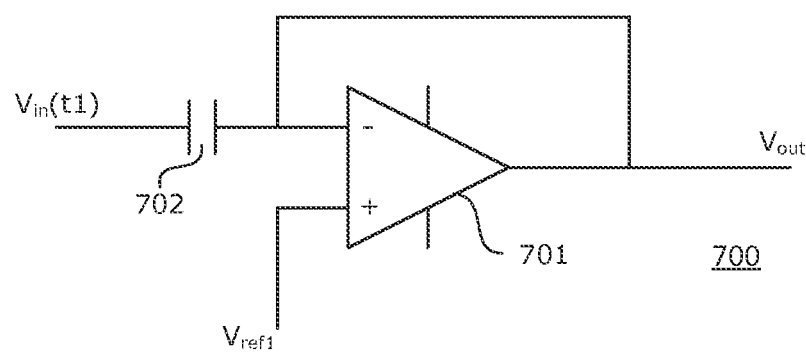
Figure 7C:
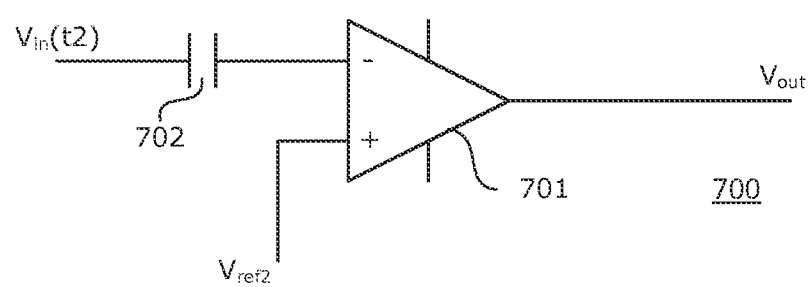

To detect whether the difference signal DIFF exceeds the threshold, a switched capacitor comparator may be used. FIGS. 7A-C illustrate a switched capacitor comparator circuit 700, which includes a differential amplifier 701, a sampling capacitor 702, and a switch 703. At a time t1 illustrated in FIG. 7B, switch 702 is closed and sampling capacitor 702 is charged to a voltage of $V_{in}(t1)-V_{ref1}$. This is referred to as the "sampling phase" in the operation of switched capacitor comparator circuit 700. At a subsequent time t2 illustrated in FIG. 7C, switch 703 is opened. Because sampling capacitor 702 has been charged to the voltage $V_{in}(t1)-V_{ref1}$, the differential voltage across differential amplifier 701 is $V_{in}(t2)-V_{in}(t1)+V_{ref1}-V_{ref2}$. Therefore, if $V_{in}(t2)>V_{in}(t1)-V_{ref1}\ V_{ref2}$, the output of switched capacitor comparator circuit 700 is at a low state "0". If, however, $V_{in}(t2)<V_{in}(t1)-V_{ref1}\ V_{ref2}$, the output of switched capacitor comparator circuit is at a high state "1". If the reference voltage is constant (i.e., $V_{ref1}=V_{ref2}$), circuit 700 strictly compares $V_{in}$ at times t2 and t1. If, on the other hand, $V_{ref1}$ and $V_{ref1}$ are unequal, circuit 700 works similarly but with a "trip point" shifted by $V_{ref1}\ V_{ref1}$.

Figure 8A:
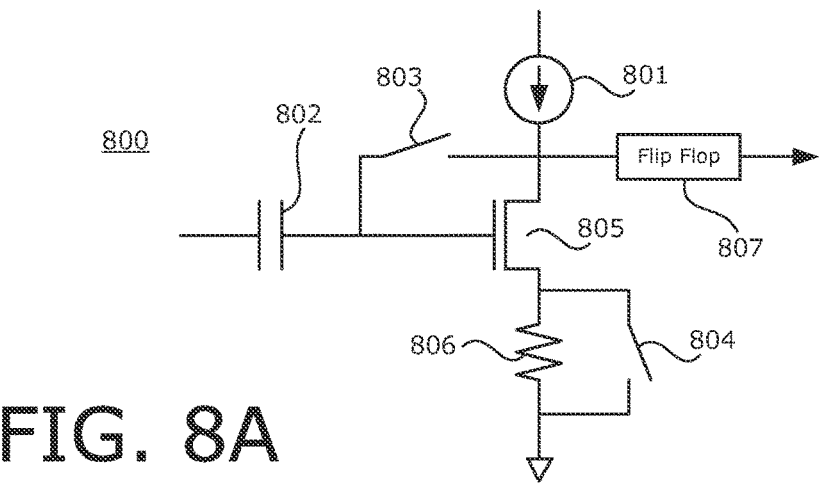
FIGS. 8A-C illustrate an exemplary shifted comparator according to various aspects of the present disclosure.
Figure 8B:
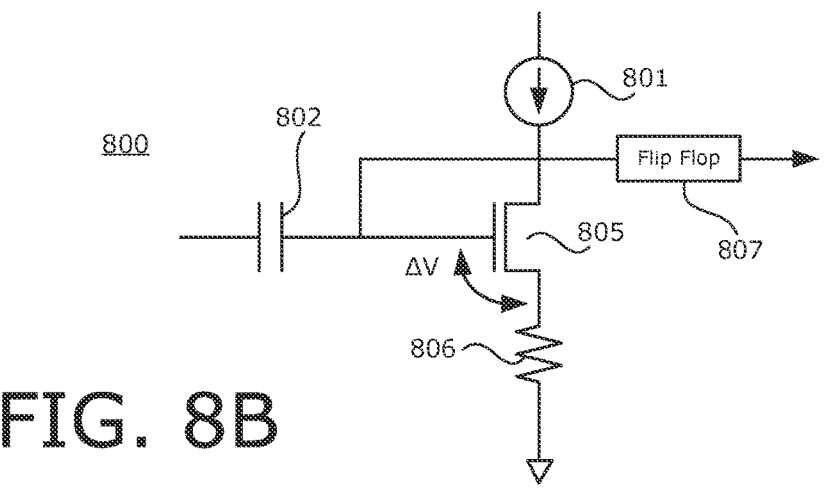
Figure 8C:
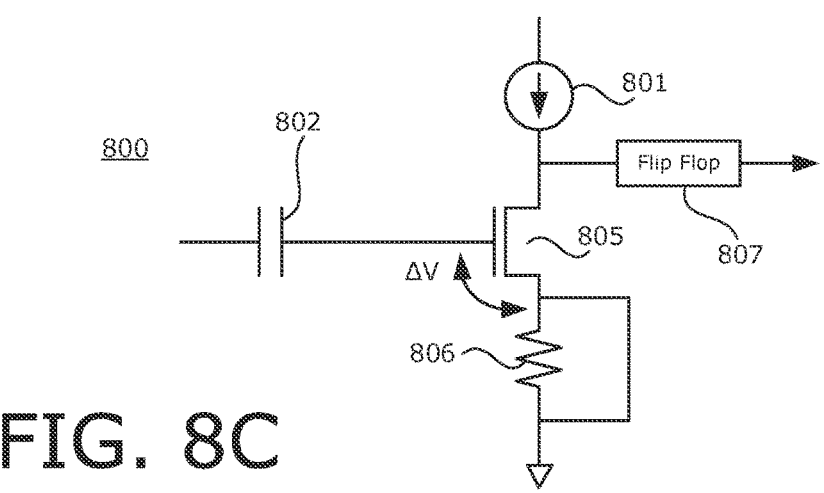

FIGS. 8A-C illustrate an implementation of a switched capacitor comparator. In this illustration, switched capacitor circuit 800 includes a current source 801 configured to output a current I, a sampling capacitor 802, switches 803 and 804, a transistor 805, a resistor 806 having resistance $R_{AGC}$, and a flip flop circuit 807 that latches the output signal and uses the latched output for gain decision. During the sampling phase, switch 803 is closed and switch 804 is open as shown in FIG. 6B. At this time t1, sampling capacitor 802 is charged to a voltage of $V_{in}(t1)-(I \times R_{AGC}+\Delta V)$ where $\Delta V$ is the gate-drain voltage of transistor 805. At time t2, switch 803 is opened and switch 804 is closed as shown in FIG. 6C. Thus, if $V_{in}(t2)>V_{in}(t1)-I \times R_{AGC}$, transistor 805 is on and the transistor output point is at a low state. If $V_{in}(t2)<V_{in}(t1)-I \times R_{AGC}$, transistor 805 is off and the transistor output point, which is the input of flip flop 807, is at a high state. As a result, the trip point of switched capacitor circuit 802 is $V_{in}(t1)-I \times R_{AGC}$.

[Dual S/H Implementation]

Figure 9:
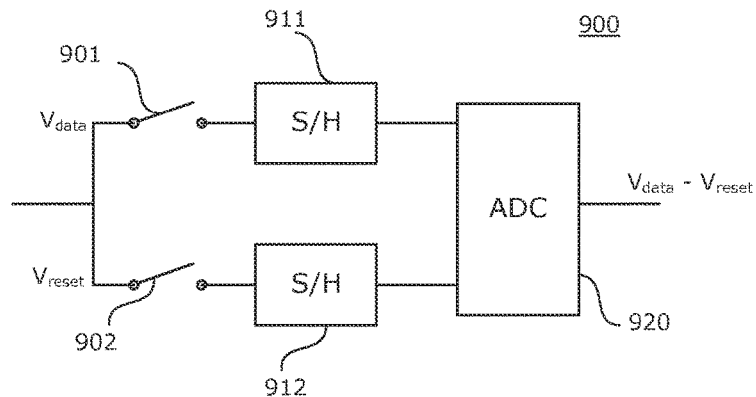
FIG. 9 illustrates an exemplary dual S/H circuit according to various aspects of the present disclosure.

To achieve sufficiently high throughput while performing CDS, the above S/H circuits may be combined in a dual S/H configuration. FIG. 9 is a block diagram of one such configuration. FIG. 9 illustrates an exemplary circuit 900 that converts the reset and data signals from a pixel into a digital form representative of $V_{data}-V_{reset}$. Exemplary circuit 900 may be, for example, the readout circuit of an image sensor pixel. Circuit 900 includes a first data path including a switch 901 and a S/H circuit 911, and a second data path including a switch 902 and a S/H circuit 912. As illustrated in FIG. 9, the first data path corresponds to data signal $V_{data}$ and the second data path corresponds to reset signal $V_{reset}$. The outputs of S/H circuits 911 and 912 are operatively connected to ADC 920, which in turn outputs the digital representation of $V_{data}-V_{reset}$.

To accomplish this, switches 901 and 902 are controlled at an appropriate timing so that S/H circuits 911 and 912 successively sample the input signal at the proper time so that $V_{data}$ and $V_{reset}$ appear at the top and bottom S/H circuits, respectively. ADC 920 converts the two voltages into digital values. Additionally, a subtraction is performed so that the appropriate output signal is obtained. This subtraction may be performed in the analog domain before analog-to-digital conversion, or may be performed in the digital domain after each signal has been individually converted to digital form.

Figure 10:
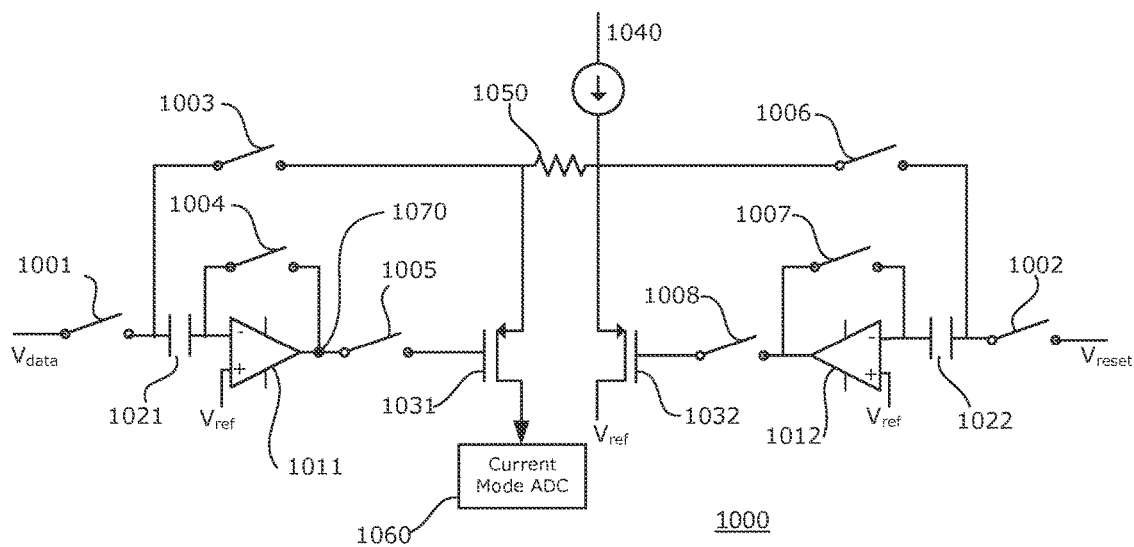
FIG. 10 illustrates an implementation of the exemplary dual S/H circuit according to FIG. 9.

FIG. 10 illustrates in more detail an exemplary dual S/H circuit 1000, which may be an example of an implementation of dual S/H circuit 1000. Dual S/H circuit 1000 includes a left S/H circuit that samples $V_{data}$ from a pixel and a right S/H circuit that samples $V_{reset}$ from the pixel. Left S/H circuit includes switches 1001, 1003, 1004, and 1005; a differential amplifier 1011; a sampling capacitor 1021; and a transistor 1031. Right S/H circuit includes switches 1002, 1006, 1007, and 1008; a differential amplifier 1012; a sampling capacitor 1022; and a transistor 1032. In this manner, the two S/H inputs sample the output from the same pixel but at different timing phases to achieve CDS. Dual S/H circuit 1000 also includes a current source 1040 configured to output a current $I_1$, a resistor 1050 having a resistance $R_1$, and a current-mode ADC 1060. The output of differential amplifier 1011 is an intermediate output node 1070.

To sample the reset signal, switches 1002 and 1007 are closed, and switches 1006 and 1008 are opened. This causes capacitor 1022 to be charged to the voltage $V_{reset}-V_{ref}$. After capacitor 822 has been charged up, switches 1002 and 1007 open (disconnect) to complete the sampling. To sample the data signal, a similar operation is performed. That is, switches 1001 and 1004 are closed, and switches 1003 and 1005 are opened. This causes capacitor 1021 to be charged to the voltage $V_{data}-V_{ref}$. After capacitor 1021 has been charged up, the switches 1001 and 1004 are opened.

In order to convert the difference between the reset to the data signal into current, switches 1003, 1005, 1006, and 1008 turn on. As a result the sampled reset voltage will appear on the right side of the resistor and the sampled data voltage will be on the left side of resistor 1050.

Because the voltages appearing on the left and right sides of resistor 1050 are $V_{data}$ and $V_{reset}$, respectively, the current that flows through resistor 1050 is $I_{in}=(V_{reset}-V_{data})/R_1$. This current flows to the input of current-mode ADC 1060 and is converted to a digital value. In this configuration, any type of current-mode ADC may be used; for example, a sigma-delta ADC may be used to convert the difference signal into a digital value with a high accuracy.

As can be seen from FIG. 10, the current from current source 1040 is split and flows into the two transistors 1031 and 1032. The current flowing through transistor 1031 is $I_{in}=(V_{reset}-V_{data})/R_1$, whereas the current at transistor 1031 is $I_2=I_1-I_{in}$. To ensure proper operation of dual S/H circuit 1000, current source 1040 is chosen so that the current value $I_1$ is larger than the maximum possible value of $(V_{reset}-V_{in})/R_1$ for any $V_{reset}$ and $V_{data}$ values.

In dual S/H circuit 1000, ADC 1060 receives as an input the current $I_{in}=(V_{reset}-V_{data})/R_1$. This indicates that the CDS subtraction step (that is, subtracting the reset value from the light exposed signal value) is automatically done in the analog domain via the circuit arrangement. This occurs without any additional circuitry required. Another benefit to the configuration of dual S/H circuit 1000 is that ADC 1060 receives a scaled version of the signal difference with a scaling factor of $1/R_1$. This is equivalent to an analog gain in the circuit. Thus, $R_1$ may be controlled (for example, by using a variable resistor, several resistors that may be selected among, and the like) to achieve various analog gains, such as gain 1 and gain G as described above. Thus, dual S/H circuit 1000 has both CDS subtraction and analog gain capabilities built in. The output of ADC 1020 is a digital value corresponding to $(V_{reset}-V_{data})/R_1$, and may include additional gain in the digital domain if desired.

To achieve AGC detection, the trip point of amplifier 1011 may be shifted as described above. Thus, a signal present at intermediate output node 1070 may be fed to a AGC circuit, such as the AGC flip flop described above with regard to FIGS. 8A-C, so that a determination can be made as to gain.

Figure 11:
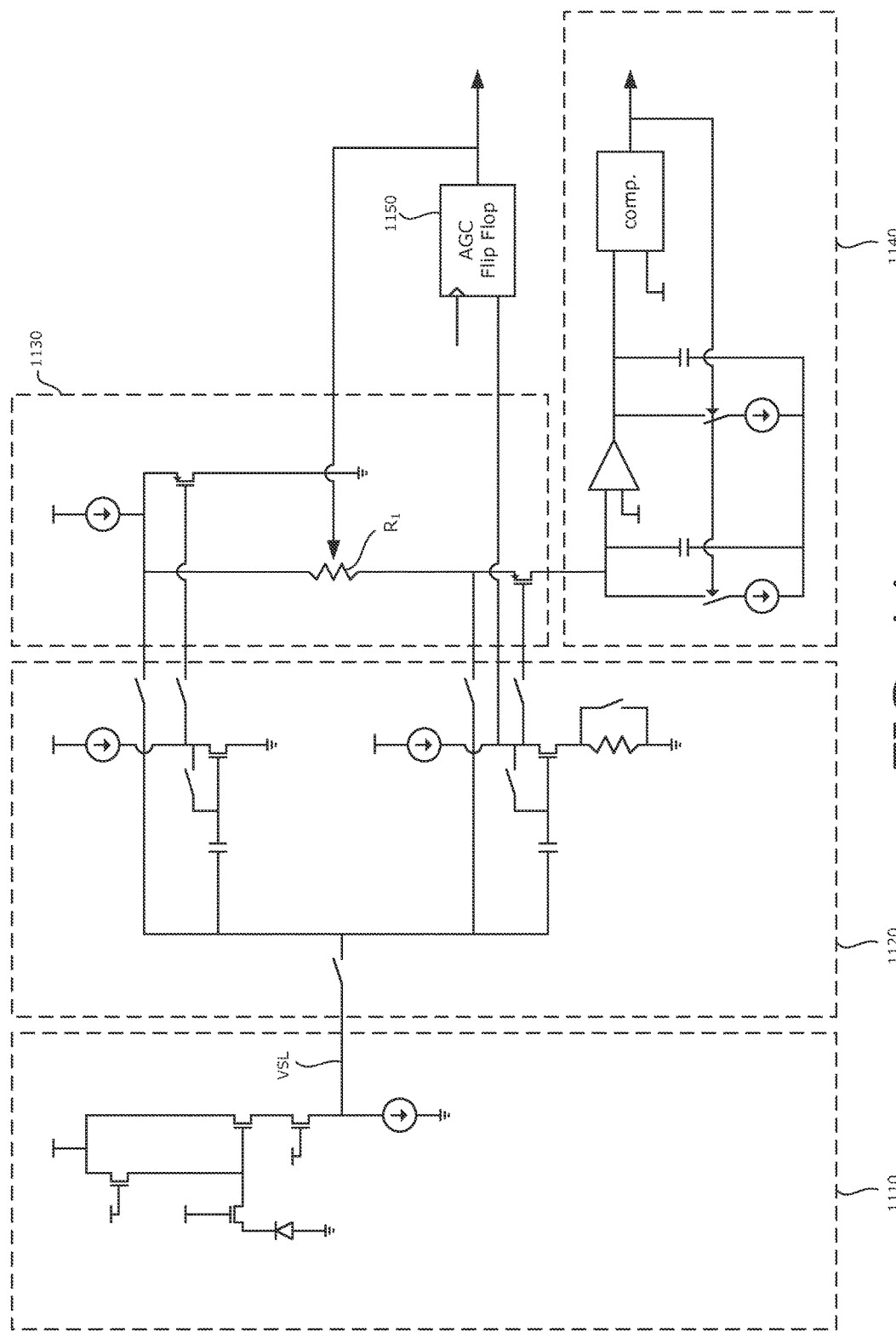
FIG. 11 illustrates another implementation of the exemplary dual S/H circuit according to FIG. 9 including an adaptive gain control circuit.

FIG. 11 illustrates an implementation of the circuit block diagram illustrated in FIG. 10. For ease of illustration, FIG. 11 only shows a single pixel in pixel array 1110, although in practical implementations this pixel is one of up to tens of millions or more. Thus, FIG. 11 represents an implementation of dual S/H circuit 1000 with trip point control and AGC determination as illustrated in FIGS. 8A-C. A full description of circuit components previously described above with respect to FIGS. 8A-C and 10 is not repeated here, for convenience.

In FIG. 11, the pixel in array 1110 outputs a pixel signal as a voltage VSL on a vertical signal line, which is clamped as described above. This signal is output to a pair of transistor S/H circuits 1120, one of which implements trip point shifting as also described above. The output of the trip-point-shifted S/H circuit is latched by an AGC flip flop 1150. When the output of flip flop 1150 is 1, this indicates that the signal is below the threshold and thus signifies a high signal where unit analog gain is used. When the output of flip flop 1150 is 0, the signal corresponds to a low input and analog gain G is used. The flip flop controls an adjustable resistor $R_1$ to achieve the desired analog gain.

The two S/H transistor circuits 1120 are connected to V2I circuit 1130, which comprises a current source having current $I_1$ and the resistor having resistance $R_1$ as described above. The resistor is connected across the two S/H outputs, and as a result the current in the resistor ($I_R$) is given by the difference between the sampled reset signal and the sampled data signal, divided by $R_1$. That is, $I_R=(V_{reset}-V_{data})/R_1$.

As illustrated in FIG. 11, the current $I_1$ is split between the resistor and a source-follower PMOS transistor that connects to ground, just as in the implementation of FIG. 10. Thus, where the current flowing through the resistor is $I_R$, the current flowing through the grounding transistor is $I_1-I_R$. Therefore, to ensure proper circuit operation, the value of current source $I_1$ is chosen so that the value $I_1$ is larger than the maximum possible value of $(V_{reset}-V_{data})/R_1$ for any $V_{reset}$ and $V_{data}$ values.

Current $I_R$ is fed via another source-follower PMOS transistor to ADC 1140, which is preferably a current mode sigma-delta ADC. Thus, ADC 1140 sees an input current $(V_{reset}-V_{data})/R_1$. As described above with regard to FIG. 10, both CDS subtraction and analog gain capabilities are therefore built in to this circuit. The output of ADC 1040 is a digital value corresponding to $(V_{reset}-V_{data})/R_1$.

ADC 1140 is not restricted to a current mode sigma-delta ADC, but may be any type of analog-to-digital converter. For example, ADC 1140 may be a single slope ADC, a flash ADC, a sigma-delta ADC, a successive approximation ADC, and the like. It is preferable to use a sigma-delta ADC for ADC 1140, because a sigma-delta ADC operates using oversampling where each conversion is the result of many high speed samples. The output from a sigma-delta ADC may be passed through a decimation filter to generate the final digital output. As a result, ADC 1140 will have an inherent low-pass filtering characteristic which helps reduce the sampling amplifiers and resistor noise.

The implementation illustrated above may be used concurrently with other circuit features that rely on similar circuit components. For example, it is possible to implement "black sun spot" detection and control using common circuit components with the AGC detection and control illustrated above.

A black sun spot is a problem in some image sensor implementations where very strong illumination (for example, if a camera is pointed at the sun) causes the reset value to be very large and possibly reach the maximum value for the circuit. In this case, both the reset value and the data value are at the lowest possible level of the circuit operating range, and thus the difference between the data value and the reset value is zero. As a result, the output becomes black when there is very strong incoming illumination. This is referred to as the "black sun spot" problem because the resultant output image shows a black spot when the camera is directly pointing at the sun.

Black sun spot detection may be implemented using a switched capacitor comparator and a flip flop in a manner similar to that illustrated above with respect to FIGS. 8A-C. In this case, a resistor having resistance $R_2$ is used. If $V_{in}(t2)>V_{in}(t1)-I\times R_2$, the associated transistor is on and the transistor output point is at a low state. If $V_{in}(t2)<V_{in}(t1)-I\times R_2$, the associated transistor is off and the transistor output point is at a high state. As a result, the trip point of the switched capacitor circuit is $V_{in}(t1)-I\times R_2$. A flip flop latches the transistor output to determine whether a black sun spot is present.

Figure 12:
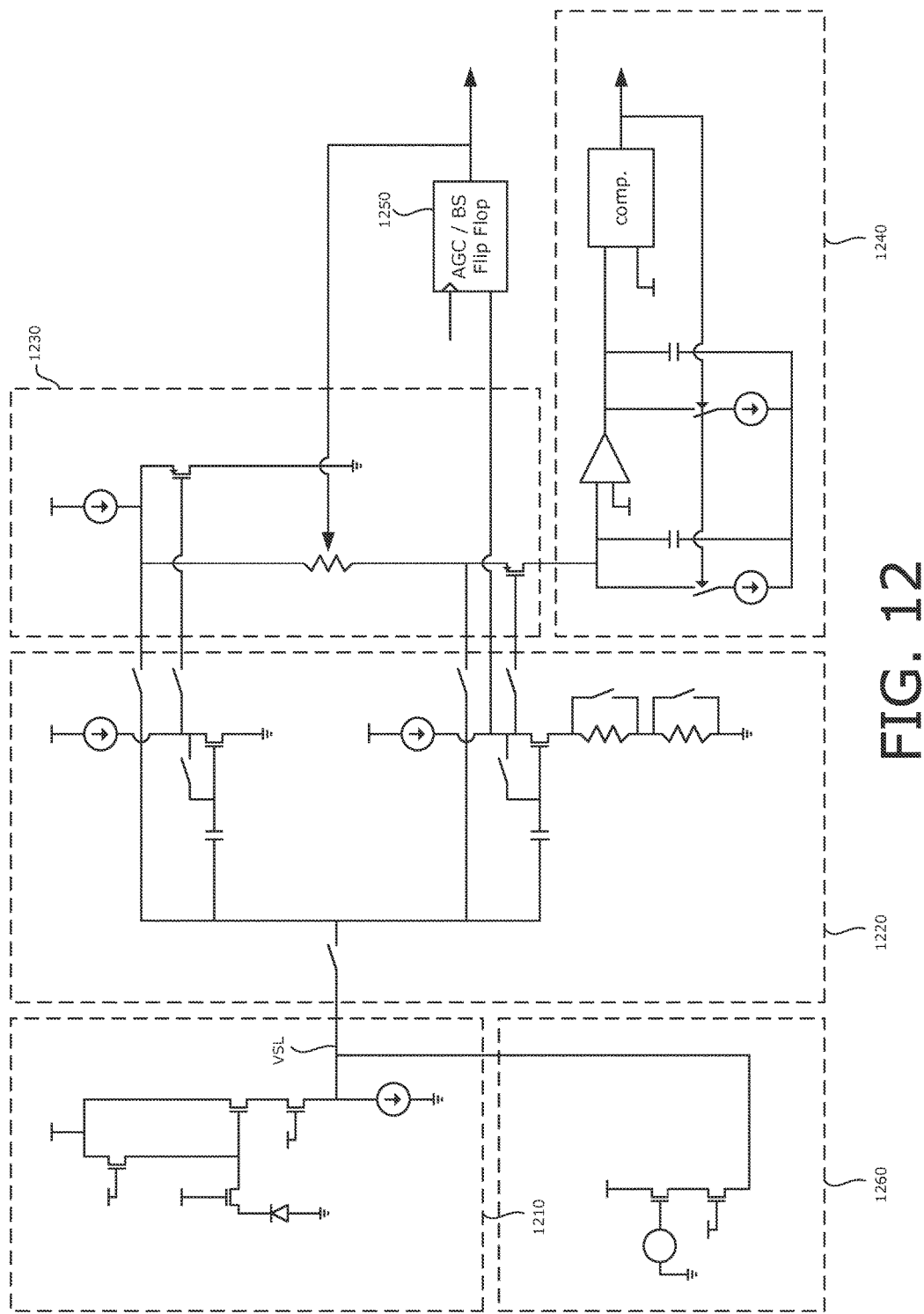
FIG. 12 illustrates another implementation of the exemplary dual S/H circuit according to FIG. 9 including an adaptive gain control circuit and a black sun spot detection circuit.

FIG. 12 illustrates an implementation including black sun spot detection and control in addition to AGC detection and control. As above, FIG. 12 only shows a single pixel in pixel array 1210, although in practical implementations this pixel is one of up to tens of millions or more.

In FIG. 12, the pixel in array 1210 outputs a pixel signal as a voltage VSL on a vertical signal line, which is clamped by a clamping circuit 1260 that will be described in more detail below. This signal is output to a pair of transistor S/H circuits 1220, one of which implements trip point shifting. In this case, to implement trip point shifting for both black sun spot and AGC, two switched resistor components are used in series. In this manner, one of the resistors is used for AGC, and the other is used for black sun spot detection. The output of the trip-point-shifted S/H circuit is latched by an AGC/black sun spot flip flop 1250.

The two S/H transistor circuits 1220 are connected to V2I circuit 1230, which comprises a current source having current $I_1$ and a resistor having resistance $R_1$ as described above. The resistor R is connected across the two S/H outputs, and as a result the current in the resistor ($I_R$) is given by the difference between the sampled reset signal and the sampled data signal, divided by $R_1$. That is, $I_R = (V_{reset} - V_{data})/R_1$.

As illustrated in FIG. 12, the current $I_1$ is split between the resistor and a source-follower PMOS transistor that connects to ground, just as in the implementation of FIG. 10. Thus, where the current flowing through the resistor is $I_R$, the current flowing through the grounding transistor is $I_1 - I_R$. Therefore, to ensure proper circuit operation, the value of current source $I_1$ is chosen so that the value $I_1$ is larger than the maximum possible value of $(V_{reset} - V_{data})/R_1$ for any $V_{reset}$ and $V_{data}$ values.

Current $I_R$ is fed via another source-follower PMOS transistor to ADC 1240, which is preferably a current mode sigma-delta ADC. Thus, ADC 1240 sees an input current $(V_{reset} - V_{data})/R_1$. As described above with regard to FIG. 10, both CDS subtraction and analog gain capabilities are therefore built in to this circuit. The output of ADC 1240 is a digital value corresponding to $(V_{reset} - V_{data})/R_1$.

ADC 1240 is not restricted to a current mode sigma-delta ADC, but may be any type of analog-to-digital converter. For example, ADC 1240 may be a single slope ADC, a flash ADC, a sigma-delta ADC, a successive approximation ADC, and the like. It is preferable to use a sigma-A delta ADC for ADC 1240, because a sigma-delta ADC operates using oversampling where each conversion is the result of many high speed samples. The output from a sigma-delta ADC may be passed through a decimation filter to generate the final digital output. As a result, ADC 1240 will have an inherent low-pass filtering characteristic which helps reduce the sampling amplifiers and resistor noise.

Clamping circuit 1260 includes a select transistor that is operated via a voltage Vclamp at the gate thereof, and a source-follower transistor. The clamping circuit restricts a minimum voltage VSL of the signal line. Thus, even if the signal line could potentially fall to a very low level as a result of very strong illumination on the photodiode, the clamping circuit maintains the voltage to a particular minimum value.

AGC/BS flip flop 1250 may be implemented as a single flip flop, or as a pair of flip flops operating in tandem such that one flip flop operates for AGC and another operates for black sun spot detection and control. In the case of a single flip flop, the AGC and BS determinations may be performed in a time divisional manner.

FIG. 13 illustrates an exemplary operation schedule for the above implementation where a single flip flop is used for both AGC and for black sun spot detection and control. During a reset phase, both the black sun spot (BS) switch and the AGC switch are turned off (open). Thus, both the black sun spot resistor and AGC resistor are active in the circuit. As a result, the sampling capacitor is charged to $V_{in} - I \times (R_1 + R_2) + \Delta V$. At the same time, the reset signal is sampled by the reset S/H of FIG. 12. During the black sun comparison stage of FIG. 12, the BS switch is turned on. Considering the voltage on the sampling capacitor noted above, the threshold of the switched capacitor comparator at this time is $I \times R_1$ for purposes of black sun spot detection. During the Tx stage of FIG. 13, the AGC switch is also turned on, such that both $R_1$ and $R_2$ are short circuited. Because the voltage on the sampling capacitor is unchanged, that means that the switched capacitor threshold becomes $I \times (R_1 + R_2)$ for the purposes of AGC decision during the AGC stage of FIG. 16. After this stage, the data signal is sampled by the data S/H during the data sampling stage.

The comparison results during both the black sun comparison and AGC stages are latched by AGC/BS flip flop 1250 illustrated in FIG. 12. The level of the latched signal is used to inform the DSP circuit to set the output to the maximum value in the case of a black sun spot being detected, and the latched signal is used to control the resistor for gain setting in the case of AGC comparison output.

[Imaging Device]

Figure 1:
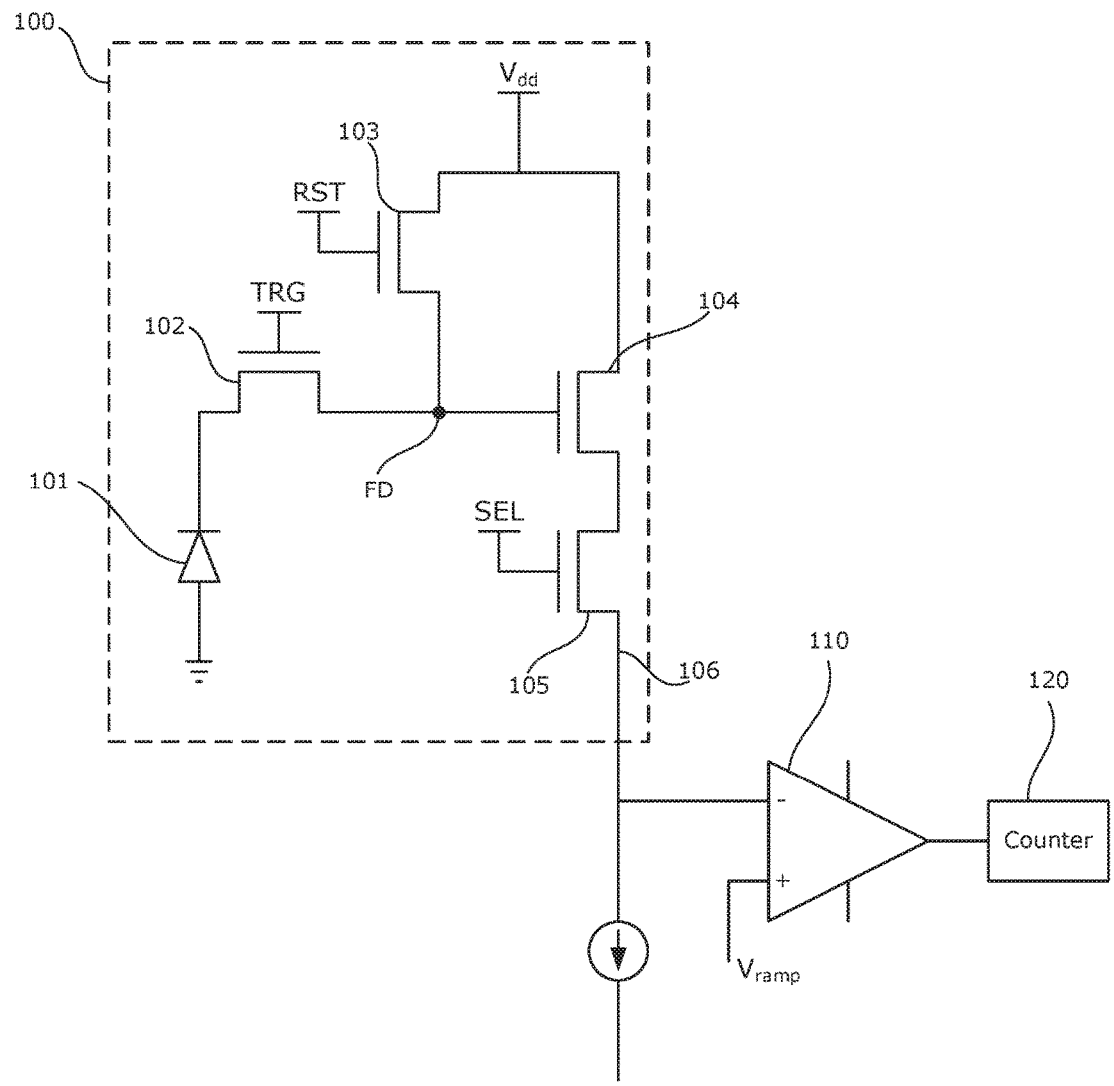
FIG. 1 illustrates an exemplary pixel circuit with single-slope ADC.
Figure 2:
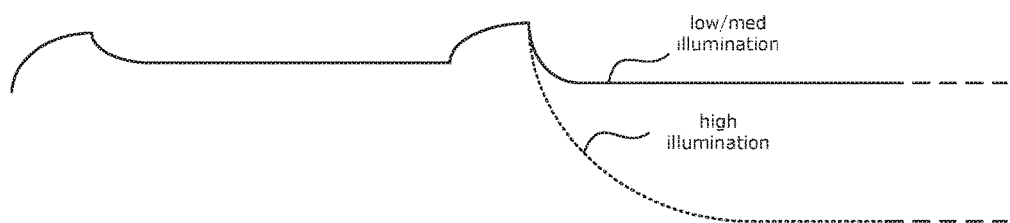
FIG. 2 illustrates exemplary timing phases and VSL waveform for a pixel circuit according to FIG. 1.
Figure 14:
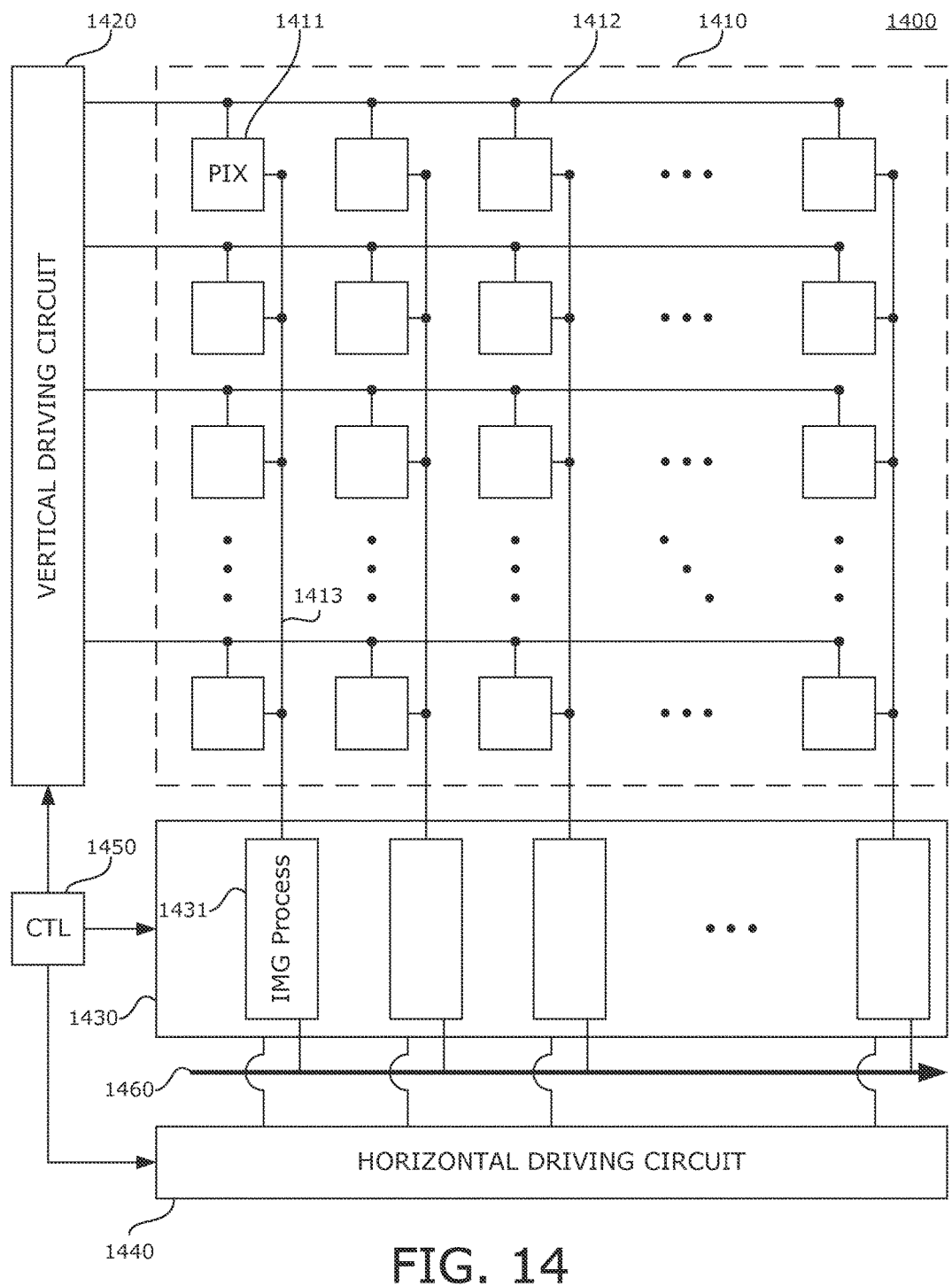
FIG. 14 illustrates an exemplary imaging device according to various aspects of the present disclosure.

FIG. 14 illustrates an image sensor 1400 that includes an image processing circuit, such as an image processing circuit as described above. Image sensor includes an array 1410 of pixels 1411 (for example, pixels as illustrated in FIG. 1). Pixels 1411 are located at intersections where horizontal signal lines 1412 and vertical signal lines 1413 cross one another. Horizontal signal lines 1412 are operatively connected to a vertical driving circuit 1420, also known as a "row scanning circuit," at a point outside of the pixel array, and carry signals from vertical driving circuit 1420 to a particular row of pixels 1411. Pixels in a particular column output an analog signal corresponding to an amount of incident light to vertical signal line 1413. For illustration purposes, only a small number of pixels 1411 are actually shown in FIG. 14; however, in practice image sensor 1400 may have up to tens of millions of pixels ("megapixels" or MP) or more.

Vertical signal line 1413 conducts the analog signal for a particular column to a column circuit 1430. While FIG. 14 illustrates one vertical signal line 1413 for each column in pixel array 1410, the present disclosure is not so limited. For example, more than one vertical signal line 1413 may be provided for each column, or each vertical signal line 1413 may correspond to more than on column. In any case, column circuit 1430 preferably includes a plurality of individual image processing circuits 1431. As illustrated, the ADC circuit includes a image processing circuit 1431 for each vertical signal line 1413; however, each image processing circuit may correspond to more than one vertical signal line 1413.

Column circuit 1430 is controlled by a horizontal driving circuit 1440, also known as a "column scanning circuit." Each of vertical driving circuit 1420, column circuit 1430, and horizontal driving circuit 1040 receive one or more clock signals from a controller 1450. Controller 1450 controls the timing and operation of various image sensor components such that analog signals from pixel array 1410, having been converted to digital signals in column circuit 1430, are output via output circuit 1460 for signal processing, storage, transmission, and the like.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An image processing circuit, comprising:
   a first sample-and-hold circuit configured to sample a first data from a pixel;
   a second sample-and-hold circuit configured to sample a second data from the pixel;
   a voltage-to-current circuit including a resistor and a current source, and configured to receive the first data and the second data and output a difference data;
   an adaptive gain control determination circuit configured to determine whether a rate of change of a signal from the pixel exceeds a first predetermined threshold based on an output of the second sample-and-hold circuit; and
   a current-mode analog-to-digital converter configured to convert the difference data from an analog form to a digital form.

2. The image processing circuit according to claim 1, wherein
   in a case where the rate of change of the signal exceeds the first predetermined threshold, the adaptive gain control determination circuit is configured to determine that a first analog gain is to be applied, and
   in a case where the rate of change of the signal does not exceed the first predetermined threshold, the adaptive gain control determination circuit is configured to determine that a second analog gain is to be applied.

3. The image processing circuit according to claim 2, wherein the resistor is a variable resistor, and the adaptive gain control determination circuit is configured to set a resistance of the resistor to a first value in a case that the first analog gain is to be applied, and to a second value in a case where the second analog gain is to be applied.

4. The image processing circuit according to claim 2, wherein the first analog gain is a gain of 1, and the second analog gain is a gain of G, where G>1.

5. The image processing circuit according to claim 4, wherein the first predetermined threshold is a dynamic range of the pixel divided by G.

6. The image processing circuit according to claim 1, wherein the second sample-and-hold circuit includes a switched capacitor comparator circuit and a threshold shifter circuit configured to shift a threshold of the switched capacitor comparator circuit.

7. The image processing circuit according to claim 1, further comprising:
   a black sun spot determination circuit configured to determine whether the rate of change of the signal from the pixel exceeds a second predetermined threshold based on the output of the second sample-and hold circuit at a timing different from a timing of the adaptive gain control determination circuit.

8. The image processing circuit according to claim 7, wherein the second sample-and-hold circuit includes a switched capacitor comparator circuit, a first threshold shifter circuit configured to shift a threshold of the switched capacitor comparator circuit, and a second threshold shifter circuit configured to shift the threshold of the switched capacitor comparator circuit.

9. The image processing circuit according to claim 8, wherein the first threshold shifter circuit and the second threshold shifter circuit are connected in series.

10. A method of processing an image, comprising:
    sampling a first data from a pixel by a first sample-and-hold circuit;
    sampling a second data from the pixel by a second sample-and-hold circuit;
    receiving the first data and the second data by a voltage-to-current circuit including a resistor and a current source;
    outputting a difference data by the voltage-to-current circuit;
    determining whether a rate of change of a signal from the pixel exceeds a predetermined threshold by an adaptive gain control determination circuit based on an output of the second sample-and-hold circuit; and
    converting the difference data from an analog form to a digital form by a current-mode analog-to-digital converter.

11. The method according to claim 10, wherein the determining comprises:
   determining that a first analog gain is to be applied in a case where the rate of change of the signal exceeds the first predetermined threshold, and
   determining that a second analog gain is to be applied in a case where the rate of change of the signal does not exceed the first predetermined threshold.

12. The method according to claim 11, wherein the resistor is a variable resistor, the method further comprising:
   setting a resistance of the resistor to a first value by the adaptive gain control determination circuit, in a case that the first analog gain is to be applied, and
   setting the resistance of the resistor to a second value by the adaptive gain control determination circuit, in a case where the second analog gain is to be applied.

13. The method according to claim 11, wherein the first analog gain is a gain of 1, and the second analog gain is a gain of G, where G>1.

14. The method according to claim 13, wherein the first predetermined threshold is a dynamic range of the pixel divided by G.

15. The method according to claim 10, wherein the second sample-and-hold circuit includes a switched capacitor comparator circuit and a threshold shifter circuit configured to shift a threshold of the switched capacitor comparator circuit.

16. The method according to claim 10, further comprising:
   determining whether the rate of change of the signal from the pixel exceeds a second predetermined threshold by a black sun spot determination circuit based on the output of the second sample-and hold circuit at a timing different from a timing of the adaptive gain control determination circuit.

17. The method according to claim 16, wherein the second sample-and-hold circuit includes a switched capacitor comparator circuit, a first threshold shifter circuit configured to shift a threshold of the switched capacitor comparator circuit, and a second threshold shifter circuit configured to shift the threshold of the switched capacitor comparator circuit.

18. The method according to claim 17, wherein the first threshold shifter circuit and the second threshold shifter circuit are connected in series.

19. An imaging device, comprising:
   a pixel including a photoelectric conversion device configured to convert an incident light into an analog signal; and
   an image processing circuit, including:
      a first sample-and-hold circuit configured to sample a first data from the pixel,
      a second sample-and-hold circuit configured to sample a second data from the pixel,
      a voltage-to-current circuit including a resistor and a current source, and configured to receive the first data and the second data and output a difference data,
      an adaptive gain control determination circuit configured to determine whether a rate of change of the analog signal from the pixel exceeds a predetermined threshold based on an output of the second sample-and-hold circuit, and
      a current-mode analog-to-digital converter configured to convert the difference data from an analog form to a digital form.

20. The imaging device according to claim 19, wherein
   in a case where the rate of change of the signal exceeds the first predetermined threshold, the adaptive gain control determination circuit is configured to determine that a first analog gain is to be applied, and
   in a case where the rate of change of the signal does not exceed the first predetermined threshold, the adaptive gain control determination circuit is configured to determine that a second analog gain is to be applied.

* * * * *